United States Patent [19]

Heltemes et al.

[11] Patent Number: 4,499,444
[45] Date of Patent: Feb. 12, 1985

[54] DESENSITIZER FOR FERROMAGNETIC MARKERS USED WITH ELECTROMAGNETIC ARTICLE SURVEILLANCE SYSTEMS

[75] Inventors: Eugene C. Heltemes, White Bear Lake; Samuel Montean, Blaine, both of Minn.

[73] Assignee: Minnesota Mining and Manufacturing Company, St. Paul, Minn.

[21] Appl. No.: 496,554

[22] Filed: May 20, 1983

[51] Int. Cl.³ .............................................. H01F 13/00
[52] U.S. Cl. ...................................... 335/284; 340/572
[58] Field of Search ................ 335/284; 324/259, 260, 324/261; 361/149, 151, 267

[56] References Cited

U.S. PATENT DOCUMENTS 3,665,449  5/1972  Elder et al. ......................... 340/572
3,781,661  12/1973  Trikilis ............................. 340/572 X
4,378,582  3/1983  Maier et al. ..................... 361/151 X

FOREIGN PATENT DOCUMENTS 3014667  4/1980  Fed. Rep. of Germany ...... 340/572

Primary Examiner—George Harris
Attorney, Agent, or Firm—Donald M. Sell; James A. Smith; William B. Barte

[57] ABSTRACT

A desensitizer apparatus for use with magnetically based electronic article surveillance systems having a marker containing at least one magnetizable section which when magnetized, alters the response of the marker produced by an alternating magnetic field provided in an interrogation zone. The apparatus includes a magnet assembly having an elongated permanent magnet section and a pair of elongated pole pieces which concentrate external fields produced by the magnet sections near a gap extending the length of the magnet section, the external field near the gap being sufficient in intensity to magnetize the magnetizable section of a marker positioned proximate thereto, and being rapidly attenuated a short distance from the gap. Accordingly, magnetically sensitive articles such as prerecorded magnetic recording cassettes to which the markers are affixed are not affected.

8 Claims, 6 Drawing Figures

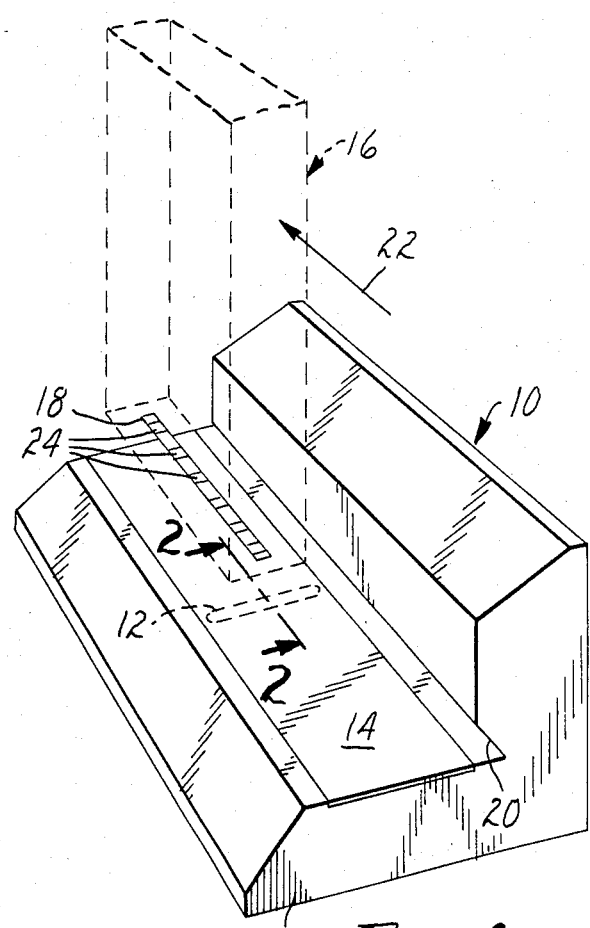
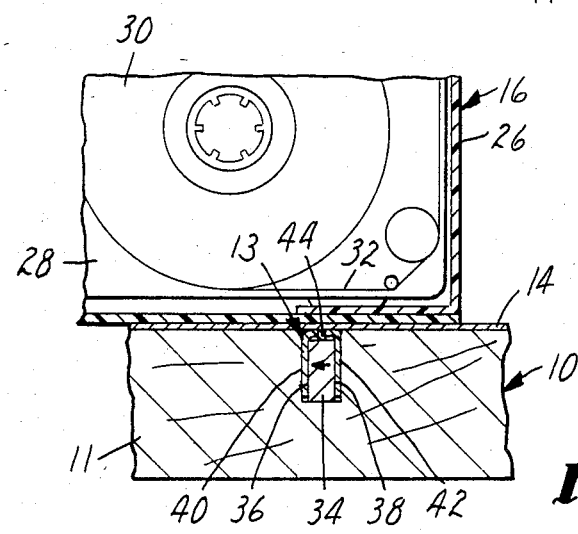

DESENSITIZER FOR FERROMAGNETIC MARKERS USED WITH ELECTROMAGNETIC ARTICLE SURVEILLANCE SYSTEMS

FIELD OF THE INVENTION

This invention relates to electromagnetic article surveillance (EAS) systems of the type in which an alternating magnetic field is applied within an interrogation zone and the presence of a high-permeability low coercive force ferromagnetic marker within the zone is detected based on signals produced by the marker in response to the applied field. In particular, the present invention relates to such systems in which the marker includes both a high-permeability, low coercive force portion and at least one magnetizable section having a higher coercive force, and which when magnetized alters the detectable signal otherwise produced, and is directed to an apparatus for desensitizing such markers, i.e., for magnetizing the higher coercive force section.

BACKGROUND OF THE INVENTION

EAS systems of the type described above, are, for example, disclosed and claimed in U.S. Pat. No. 3,665,449 (Elder and Wright). As set forth at Col. 5, lines 10 to 39 therein, a dual status marker of the type described above may be desensitized, i.e., the high-coercive force section thereof magnetized, by placing the marker in the field of a large permanent magnet of sufficient intensity, and gradually removing the field, such as by withdrawing the marker therefrom. As also there disclosed, such a magnetization operation may be effected by imposing on the marker a unipolar pulsed field of gradually decreasing intensity. That patent also suggests that desensitization may be effected by exposing the marker to fields of alternating polarity provided by an array of permanent magnets.

While such techniques may be useful in many areas and with the markers affixed to a wide variety of articles, the magnetic fields associated therewith have been found to unacceptably interfere with magnetic states associated with certain articles. For example, the compact size and popularity of prerecorded magnetic audio and video cassettes make such articles frequent targets for shoplifters, and hence likely articles with which anti-theft markers would be used. At the same time however, such affixed markers would be desirably desensitized upon purchase, and it has been found that prior art desensitizer apparatus such as described above may unacceptably affect signals prerecorded on magnetic tapes within the cassettes.

SUMMARY OF THE INVENTION

In contrast to the desensitizer apparatus of the prior art acknowledged above in which the intensity of the magnetic fields produced thereby extend from the apparatus in a virtually uncontrolled fashion, the apparatus of the present invention provides a unipolar field which rapidly decreases in intensity only a short, controlled distance from the apparatus and thus while being capable of magnetizing high-coercive force sections of a marker brought close thereto, would be incapable of interfering with the magnetic signals recorded on tapes within a cassette to which the marker is affixed.

The desensitizer apparatus of the present invention is thus adapted for use with an electronic article surveillance system for detecting a desensitizable marker secured to an article, the presence of which, within an interrogation zone is desirably known, and is particularly adapted for use with such markers affixed to the outer surface of a prerecorded audio or video cassette. The marker in such a system includes an elongated strip of low coercive force, high-permeability ferromagnetic material and at least one section of a remanently magnetizable high coercive force material proximate to the first material and which when magnetized, magnetically biases the elongated strip of low coercive force material and thereby alters the detectability of the marker.

The desensitizer apparatus comprises a permanent magnet assembly which includes at least one section of a permanent magnet ferromagnetic material having two substantially opposed major surfaces and a pair of pole pieces each of which is proximate to and extends over a major portion of the major surfaces and terminates proximate to the other pole piece to provide a gap of substantially constant width extending along the length of the permanent magnet material. The permanent magnet material is substantially uniformly magnetized to present one magnetic polarity at one of the major surfaces and the opposite polarity on the other major surface. The pole pieces in turn concentrate external magnetic lines of flux resulting from the magnetized material near the gap. The resultant external magnetic field thus decreases rapidly with increasing distance from the gap, and enables a marker to be moved relative to the gap to remanently magnetize the section of said high coercive force material within the marker. In contrast, the external field intensity extending beyond a short distance from the gap is insufficient to alter magnetic states such as may exist within an article to which the marker is secured.

BRIEF DESCRIPTION OF THE DRAWINGS

FIG. 1 is a perspective view of one embodiment of the desensitizer apparatus of the present invention;

FIG. 2 is a partial cross sectional view of the embodiment of FIG. 1, taken along the lines 2—2;

DESCRIPTION OF THE PREFERRED EMBODIMENT

Figure 3:
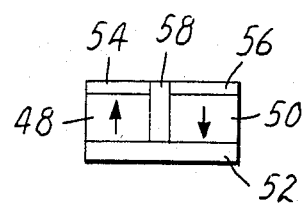
FIGS. 3-5 are side views of alternative constructions of the magnet assembly used in the desensitizer apparatus.

As shown in FIG. 1, the desensitizer apparatus of the present invention may be in the form of a desk mounted apparatus 10 having a housing 11 and concealed within a cavity 12 therein, a magnet assembly as described hereafter. The cavity 12 is in turn covered by a nonmagnetic cover plate 14 which both covers and protects the magnet assembly and also provides a wear surface over which articles having desensitizable markers affixed thereto may be passed during the use of the desensitizer apparatus. For example, such a cover plate may comprise a polished strip of a copper-nickel-zinc alloy having a thickness in the range of 10 mils. (0.25 mm). The use of a polished metallic cover plate 14 is further desired as such a surface resists scratching or chipping as may otherwise occur with cover plates having a polymeric or painted surface and thereby remains aesthetically acceptable even over many cycles of use.

The configuration shown in FIG. 1 is further preferably provided with a triangular recess 20 which extends along the working surface and assists in maintaining bulky articles to which a marker 18 may be affixed in contact with the cover plate 14 so that the fields provided by the magnet assembly within the recess 12 will be able to magnetize the high coercive force portions of the marker. Such an article could, for example, be a jacketed phonograph record having a marker affixed near one edge of the jacket.

While the apparatus 10 may be used with the working surface established by the cover plate 14 in a horizontal position, such that an article 16 may be moved across the horizontal surface, the apparatus may also be positioned to have the working surface vertical. More bulky articles may then be moved in from one side.

The housing 11 of the apparatus 10, as shown in FIG. 1, is preferably constructed of non-magnetic materials, and may be fabricated from appropriately dimensioned and finished hardwood or may be formed from injection molded plastic. The bevelled faces provided in the housing 11 may be utilized to carry appropriate legends, manufacturer identification, instructions and the like.

In using the apparatus of FIG. 1, it will be recognized that the article 16 is to be moved in the direction shown by arrow 22, thus causing a desensitizable marker 18 affixed to one surface to be moved so that the marker 18 is passed over the magnet assembly within the cavity 12. Thus, for example, if the article 16 is a typically packaged audio cassette, the marker 18 could be affixed to one side of the box provided for cassette storage and the box held so as to be positioned on the cover plate 14 and passed therealong.

The marker 18 is typically constructed of an elongated strip of a high permeability, low coercive force ferromagnetic material such as permalloy, certain amorphous alloys, or the like. The strip is further provided with a plurality of high coercive force magnetizable sections 24. These sections are typically formed of a material such as vicalloy, silicon steel or the like, typically having a coercive force in the range of 50 to 240 oersteds. When such sections are magnetized, the residual fields provided thereby magnetically bias the low-coercive-force strip and substantially alter the signal response produced in the presence of an interrogating field. The magnetization of the sections 24 is effected upon exposure to the fields provided by the magnet assembly when those sections are brought into close proximity with the assembly.

The details of Example 1 of such a magnet assembly are shown in the cross sectional view of FIG. 2. As may there be seen, the housing 11 of the desensitizer apparatus 10 is shown to have a recess within which a magnet assembly 13 is positioned. The top of the recess is enclosed by the cover plate 14.

As further shown in FIG. 2, the article 16 may include an outer enclosure 26, such as a storage box, and a prerecorded audio cassette 28. The cassette is further shown to include a reel of magnetic tape 30 having one portion 32 passing along a tape path bringing it into the vicinity of the magnet assembly 13. The configuration of the article 16 as shown in FIG. 2 thus presents a worst case, wherein a portion of the tape 32 may be relatively close to the magnet assembly such that the fields provided thereby could unacceptably affect the magnetic states within the tape were it not for the special configuration of the assembly.

As shown in FIG. 2, Example 1 of the magnet assembly 13 comprises a section of a permanent magnet material 34 which is magnetized so as to have one magnetic polarity extending along a first major surface 36 and the opposite magnetic polarity extending along the surface 38. The assembly further includes a pair of pole pieces 40 and 42 respectively, which members are formed of magnetically "soft" steel and are configured so as to extend around the ferromagnetic material 34 and to thereby define a gap 44 within which the external magnetic field provided by the magnetized element 34 are concentrated. In this and subsequent examples, the section(s) of permanent magnetic material were cut from a flexible magnet material, type B1013 "Plastiform" sold by 3M Co., St. Paul, Minn., magnetized conventionally. In particular, the assembly 13 was formed of a section of such a magnet material approximately 0.125 inch (0.317 cm) wide and approximately 0.25 inch (0.635 cm) high, extending lengthwise into the drawing a distance of approximately 1.125 inches (2.86 cm). The gap 44 was approximately 0.025 inches (0.635 mm) wide. Each of the pole pieces, 40 and 42 respectively, which define the gap were formed of a soft silicon steel, i.e., isotropic type M-19. The gap 44 was further maintained by including therein a small rectangular section of a non-magnetic material (aluminum) having the dimensions of the gap, while extending the entire length of the pole pieces, i.e., 1⅛ inches (2.86 cm) long.

Figure 4:
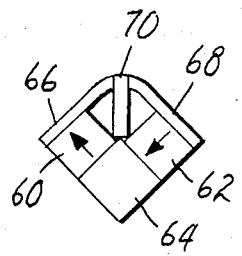
Figure 5:
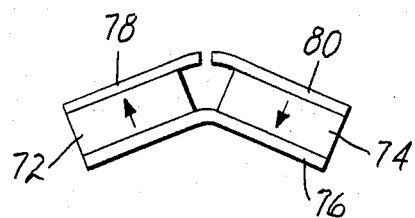

Alternative constructions for the magnet assembly, such as the assembly 13 shown in FIG. 2, are set forth in FIGS. 3, 4 and 5. As first shown in the end view of FIG. 3, one such alternative construction may utilize two sections of a permanent magnetic material 48 and 50 respectively, formed of a flexible permanent magnet material as in the preceding example. A flux return path for the fields provided by the sections 48 and 50 is provided by a flux return member 52 while the gap is defined by pole pieces 54 and 56. The gap is further maintained by a non-magnetic spacer element of aluminum 58. The assembly shown in FIG. 3 demonstrates certain advantages and disadvantages over the assembly 13 shown in the cross-sectional view of FIG. 2. For example, the embodiment shown in FIG. 3 requires two sections of permanent magnetic material 48 and 50 rather than the single section 34 shown in FIG. 2, and further requires that three ferromagnetic flux controlling members be provided; the pole pieces 54 and 56 respectively and the flux return member 52. On the other hand, however, the pole pieces 54 and 56 need only be flat, stamped members and need not be further shaped, as in the case of the pole pieces 40 and 42 of FIG. 2. It may further be noted, that in order to provide a uniform, unipolarity magnetic field across the gap defined by the non-magnetic member 58, the permanent magnetic members 48 and 50 are each magnetized to provide one magnetic polarity along one face and the opposite polarity along the other face and the two members are in turn positioned so that the opposite magnetic polarities are presented to each of the respective pole pieces 54 and 56.

An alternative magnet assembly similar in many respects to that of FIG. 3 is set forth in FIG. 4. As may there be seen, two similar sections of a permanent magnetic material 60 and 62 are provided. However, in this embodiment, a flux return member 64 having a square cross section is provided, and the permanent magnet sections 60 and 62 are positioned on adjacent faces at 90 degrees with respect to each other. The pole pieces 66 and 68 are positioned on the opposite faces of the permanent magnet sections 60 and 62 and are further configured to establish a gap therebetween, which gap is further maintained by the presence of a section of aluminum 70. While the shaping of the pole pieces 66 and 68 thus involves a further processing step over the embodiment of FIG. 3, the embodiment of FIG. 4 may be desired, as much of the pole pieces 66 and 68 are below the level of the gap such that the external magnetic fields present along the pole pieces 66 and 68 are further separated from the working surface of the magnet assembly and are thereby less apt to interfere with magnetic states in an associated article.

Finally, a further embodiment is shown in FIG. 5, wherein the two sections of permanent magnet material 72 and 74 are combined with a flux return member 76 and two planar pole pieces 78 and 80. As may there be seen, the pole pieces are simple planar stampings, while the flux return member 76 is bent to cause the pole pieces 78 and 80 to meet at an angle, such as approximately at 135 degrees, the pole pieces extending away from the gap defined at their intersecting edges. In the embodiment shown in FIG. 5, no non-magnetic gap maintaining member has been included, the gap being defined solely by the pole pieces 78 and 80, they being maintained in position together with the permanent magnet members 72 and 74 and the flux return member 76 by virtue of suitable adhesives. As in the case of the embodiment shown in FIG. 3, the alternative constructions shown in FIGS. 4 and 5 also include respective permanent magnet members having one magnetic polarity at one major face and the opposite magnetic polarity at the other major face, each of the pairs of magnetic material being oppositely configured so as to present a single magnetic polarity extending across the gap and continuing down the length thereof.

Examples 2–8 are exemplary of specific constructions having the general cross sections shown in one of the FIGS. 3–5. In all the examples, the permanent magnet sections were cut from types ⅛th inch (0.3175 cm) thick type B1013 flexible magnet material manufactured by 3M, Co., St. Paul, Minn. under the tradename "Plastiform", and were conventionally magnetized to have one magnetic polarity on one major surface and the opposite polarity on the other surface. The sections were cut and fabricated to provide Examples 2–8 as follows:

Example 2 was like that of Example 1, such as shown in FIG. 2, except that 2 pieces of flexible magnet material, each 0.125 inch (0.3175 cm) wide were sandwiched together with the magnetic polarities in the same direction, giving a total width of permanent magnet material between the pole pieces of 0.25 inch (0.63 cm). The gap, maintained by an Al spacer, was 0.049 inch (1.24 mm).

Example 3 was like the embodiment shown in FIG. 3, and used two pieces of like flexible permanent magnet material, each piece being 0.25 inch (0.63 cm) wide and extending 0.125 inch (0.3175 cm) between the flux return member 52 and the pole pieces 54 and 56 respectively. A gap of 0.049 inch (1.24 mm) was maintained by an Al spacer.

Example 4 was also like the embodiment shown in FIG. 3, also using two pieces of like flexible magnet material, each piece being 0.187 inch (0.476 cm) wide and also extending 0.125 inch (0.3175 cm) between the flux return member and pole pieces. The gap of 0.049 inch (1.24 mm) was also maintained by an Al spacer.

Example 5 was also like the embodiment shown in FIG. 3, and used two pieces of like flexible magnet material each piece being 0.125 inch (0.3175 cm) wide and also extending 0.125 inch (0.3175 cm) between the flux return member and the pole pieces. In this example, the gap, maintained by an Al spacer, was opened to 0.067 inch (1.7 mm).

Example 6 was also like the embodiment shown in FIG. 3, but used 4 pieces of like flexible magnet material, each 0.125 inch (0.3175 cm) wide and 0.125 inch (0.3175 cm) between poles, but wherein two pieces were stacked together to form each magnet section, thus providing a magnet 0.25 inch (0.63 cm) between the flux return member and pole pieces. The gap, fixed by an Al spacer, was 0.065 inch (1.65 mm).

Example 7 was like the embodiment shown in FIG. 4, and used two pieces of like flexible magnet material, each being 0.25 inch (0.63 cm) wide and 0.125 inch (0.3175 cm) between poles. A square cross-sectional flux return member 64, 0.25 inch × 0.25 inch (0.63 × 0.63 cm), of soft steel was used, together with an Al spacer 70 to provide a gap of 0.062 inch (1.57 mm).

Example 8 was like the embodiment shown in FIG. 5, and used two pieces of like flexible magnet material, each being 0.25 inch (0.63 cm) wide and 0.125 inch (0.3175 cm) between poles. The flux return member 76 was bent at 135° and the pole pieces 70 and 80 separated to provide a gap of 0.049 inch (1.24 mm).

The intensities of the component of the magnetic field across to the gap, measured at varying distances therefrom, for Examples 1–8 are listed in Table I below. Also listed in the table is the cross-sectional area of magnet material used in each example. As shown in Table I, where more magnet material was used and where the gap was smaller, the intensity of the field nearer the gap was greater, however in nearly all cases, even at a distance of only 0.25 inch from the gap, the field intensity was generally less than 100 Oe.

TABLE I

| | | Field Intensity at Varying Distances from Gap (Oe.) | | | | | |
|---|---|---|---|---|---|---|---|
| Example | FIG. | Cross-Section of Permanent Magnet Material (cm$^2$) | Distance from Gap (cm) | | | | |
| | | | 0.24 | 0.32 | 0.64 | 0.95 | 1.27 |
| 1 | 2 | 0.2 | 250 | 135 | 60 | 30 | 20 |
| 2 | 2 | 0.4 | 345 | 195 | 85 | 45 | 30 |
| 3 | 3 | 0.4 | 405 | 300 | 135 | 70 | 40 |
| 4 | 3 | 0.3 | 320 | 200 | 90 | 45 | 25 |
| 5 | 3 | 0.2 | 240 | 140 | 60 | 30 | 20 |
| 6 | 3 | 0.4 | 256 | 170 | 70 | 35 | 22 |
| 7 | 4 | 0.4 | 350 | 200 | 80 | 45 | 25 |
| 8 | 5 | 0.4 | 430 | 270 | 125 | 60 | 35 |

Table II lists normalized field intensities as a function of distance from the gap for examples 1–8, and would thus correspond to such adjustments in amounts of magnet material, and magnetization levels as would be necessary to result in a peak field intensity like that of Example 1.

TABLE II

| Relative Field Intensity at Varying Distances from Gap (Normalized to Peak Field Intensity of 250 Oe) | | | | | |
|---|---|---|---|---|---|
| | Distance from Gap (cm) | | | | |
| Example | 0.24 | 0.32 | 0.64 | 0.95 | 1.27 |
| 1 | 250 | 135 | 60 | 30 | 20 |
| 2 | 250 | 140 | 62 | 32 | 22 |
| 3 | 250 | 185 | 82 | 42 | 25 |
| 4 | 250 | 155 | 70 | 35 | 20 |
| 5 | 250 | 145 | 62 | 30 | 20 |
| 6 | 250 | 165 | 67 | 35 | 22 |
| 7 | 250 | 142 | 57 | 32 | 17 |
| 8 | 250 | 157 | 72 | 35 | 20 |

As here shown, the rate of decrease in field intensity as a function of distance from the gap is generally the same for all examples, and all indicate that at a distance of slightly less than 0.25 inches the maximum field intensity would be less than about 100 Oe, while providing a field in excess of 250 Oe near the gap. Fields less than about 100 Oe have generally been found to have no effect on prerecorded magnetic tapes. A magnetically sensitive article such as an appropriately boxed, prerecorded cassette may be positioned above the working surface of a desensitizer apparatus such as shown in FIG. 1 and the tape therein will never be closer than approximately ¼ inch from the gap 44 as shown in FIG. 2. As so positioned, the prerecorded signals on the tape would be unaffected. In contrast, the high coercive force sections 24 of a marker 18 such as shown in FIG. 1, and which have been omitted in FIG. 2 for purposes of clarity, will be typically separated from the pole pieces only by the thickness of the cover plate 14 and will thus typically be exposed to the field intensity in excess of 250 oersteds and will thereby become magnetized so as to desensitize the marker 18.

Figure 6:
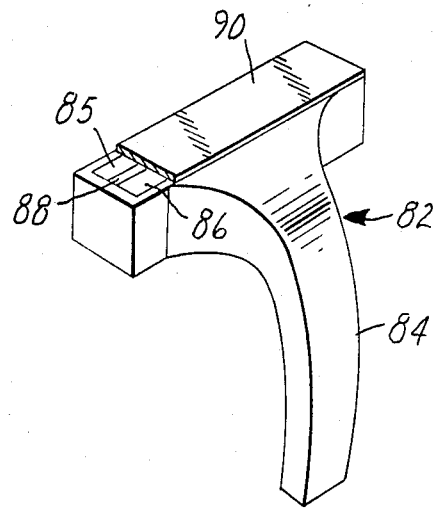
FIG. 6 is a partially broken away perspective view of a hand-held desensitizer apparatus of the present invention.

As shown in FIG. 6, a further embodiment of the desensitizer apparatus of the present invention is intended for use as a hand-held device. In such an embodiment the apparatus 82 includes a handle portion 84 and a head portion. Within a recess therein is positioned a magnet assembly including pole pieces 85 and 86, which define therebetween a gap 88. The magnet assembly is in turn covered by a thin non-magnetic cover member 90.

A variety of embodiments and alternative configurations of the apparatus of the present invention have been set forth hereinabove. It may readily be appreciated that numerous variations may be readily constructed by one skilled in the art, such constructions including the use of a variety of types of permanent magnets, both cast and flexible-bonded types. A variety of pole piece configurations may also be used. It may further be recognized that the length of the gap provided by the various configurations of the present invention is substantially unlimited, it being limited only by the length of the permanent magnet member and pole pieces provided for use therewith. Thus a desensitizer device according to the present invention may be constructed having variable length gaps, enabling its use with varying size articles, and articles wherein the magnetic antipilferage markers are affixed at various locations on the articles such that the markers and/or the article need not be accurately positioned with respect to the desensitizer apparatus.

We claim:

1. A desensitizer apparatus adapted for use with an electronic article surveillance system for detecting a desensitizable marker secured to an article the presence of which within an interrogation zone is desirably known, said marker including an elongated section of low coercive force, high permeability ferromagnetic material having proximate thereto at least one section of a remanently magnetizable high coercive force material which when magnetized magnetically biases the elongated section of low coercive force material and thereby alters the detectability of the marker, said desensitizer apparatus comprising a permanent magnet assembly which includes at least one section of ferromagnetic material having two substantially opposed major surfaces and which is substantially uniformly magnetized to present one magnetic polarity at one of said major surfaces and the opposite polarity on the other major surface, and a pair of pole pieces each of which is proximate to and extends over a major portion of said major surfaces and terminates proximate to the other pole piece to provide a gap of substantially constant width extending along said section for concentrating external magnetic lines of flux resulting from said magnetized material near the gap such that the resultant external magnetic field decreases rapidly with increasing distance from the gap, thereby enabling a said marker to be moved relative to said gap to remanently magnetize the section of said high coercive force material within the marker, the external field intensity extending beyond a short distance from the gap being insufficient to alter magnetic states such as may exist within an article to which the marker is secured.

2. An apparatus according to claim 1, further comprising a housing having a surface adapted to support a said article as a marker secured thereto is moved past the gap, and having a recess opening onto said surface within which said magnetic assembly is positioned, the gap of the assembly being substantially coplanar with said surface.

3. An apparatus according to claim 2, further comprising a thin non-magnetic metallic plate covering said surface to protect said assembly while providing a durable surface which allows the magnetic lines of flux to extend therethrough substantially unattenuated.

4. An apparatus according to claim 1, further comprising a housing adapted to be hand held for transporting the apparatus relative to an article to which a said marker is affixed, said housing having a recess opening onto the outer surface within which said magnetic assembly is positioned, the gap of the assembly being substantially coplanar with the surface.

5. An apparatus according to claim 1, wherein said assembly comprises a single permanent magnet having opposed major surfaces each of which has extending over a substantial portion thereof a pole piece which further extends around one side of said magnet and terminates proximate to the other pole piece to form said gap.

6. An apparatus according to claim 1, wherein said assembly comprises at least two sections of said magnetized ferromagnetic material each having substantially opposed major surfaces and oriented to present opposite magnetic polarities to an adjacent pole piece forming the gap and further comprising an additional pole piece extending between the opposite major surface of both sections of magnetized material for providing a flux return path.

7. An apparatus according to claim 1, wherein said assembly and the gap thereof extends over a length comparable to one dimension of one surface of an article with which the apparatus is to be used, thereby enabling a marker to be secured at virtually any position on that surface of the article and still be desensitized upon movement of that surface proximate to said gap.

8. A desensitizer apparatus adapted for use with an electronic article surveillance system for detecting a desensitizable marker secured to a housing containing a prerecorded magnetic tape, the presence of which within an interrogation zone is desirably known, said marker including an elongated section of low coercive force, high permeability ferromagnetic material having proximate thereto at least one section of a remanently magnetizable high coercive force material which when magnetized magnetically biases the elongated section of low coercive force material and thereby alters the detectability of the marker, said desensitizer apparatus comprising a permanent magnet assembly which includes at least one section of a permanent magnet ferromagnetic material having two substantially opposed major surfaces and which is substantially uniformly magnetized to present one magnetic polarity at one of said major surfaces and the opposite polarity on the other major surface, and a pair of pole pieces each of which is proximate to and extends over a major portion of said major surfaces and terminates proximate to the other pole piece to provide a gap of substantially constant width extending along said section for concentrating external magnetic lines of flux resulting from said magnetized material near the gap such that the resultant external magnetic field decreases rapidly with increasing distance from the gap, thereby enabling a said marker to be moved relative to said gap to remanently magnetize the section of said high coercive force material within the marker, the external field intensity extending beyond a short distance from the gap being insufficient to appreciably alter the prerecorded magnetic patterns on the tape when the assembly is moved relative to a surface of the housing having a said marker affixed thereto and the marker is resultantly desensitized.

* * * * *